Sept. 16, 1924.                                              1,508,613
                          A. POUCHAIN
              NEGATIVE PLATE FOR ELECTRIC ACCUMULATORS
                       Filed Aug. 18, 1920

Inventor:
Adolfo Pouchain
By Lawrence Langner
      Attorney.

Patented Sept. 16, 1924.

1,508,613

UNITED STATES PATENT OFFICE.

ADOLFO POUCHAIN, OF TURIN, ITALY.

NEGATIVE PLATE FOR ELECTRIC ACCUMULATORS.

Application filed August 18, 1920. Serial No. 404,453.

*To all whom it may concern:*

Be it known that I, ADOLFO POUCHAIN, a subject of the King of Italy, and resident of Turin, Italy, have invented certain new and useful Improved Negative Plates for Electric Accumulators, of which the following is a specification.

This invention relates to the manufacture of zinc negative plates for electric accumulators, such that they are not perforated by action of repeated discharges of excessive intensity.

The essential feature of this invention is that the support on which the zinc is deposited is a plate, the surface at least of which is of a metal that is a good electrical conductor and not liable to be attacked, when the circuit is closed, by the sulphuric acid electrolyte used in the accumulator.

A metal which satisfies these conditions is, for example, silver which, by reason of its high electrical conductivity, at the same time improves the operation of the accumulator as a whole.

To form an accumulator plate according to this invention there may be used, for instance, a plate of silver or of another metal covered with silver and upon this plate there are deposited one or more layers of zinc. Preferably said zinc is deposited by a method of the kind hereinafter described, producing an immunized zinc layer, that is, a deposit not liable to be attacked by the solution of sulphuric acid when the circuit is open.

Figure 1:
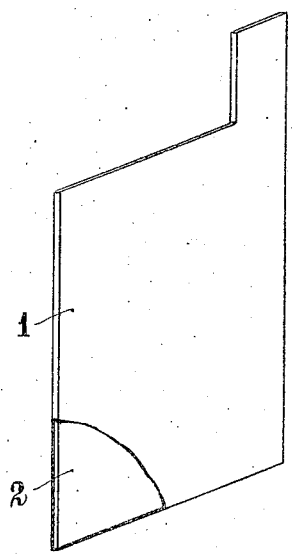
Figure 2:
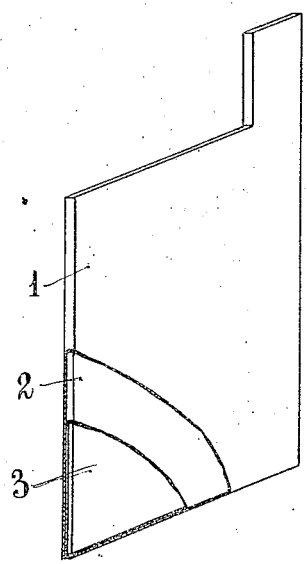

The annexed drawing shows by way of example two embodiments of this invention, Figure 1 being a fragmentary view showing a plate according to this invention; Figure 2 being a similar view of a modified construction.

In Figure 1 the plate comprises an outer coating of zinc, 1, which is the active material in the accumulator operation, and said coating of zinc is deposited on a plate 2, which is a metal that is a good conductor and is not attacked when the circuit is closed, as silver; the embodiment according to Figure 2 comprises a zinc coating 1 deposited on a skin 2 of a metal which is a good conductor and is not attacked when the circuit is closed, as silver, and this skin is in turn carried by a plate 3 which may be of any desired metal.

In these plates even when, owing to repeated discharge at excessive intensity, the zinc has been completely eaten away at some parts of the plate, the latter cannot be perforated since the metal which constitutes or coats the support cannot be attacked and the deposit may be re-formed during the succeeding periods of re-charging at those places where it has been destroyed.

The form of the supporting plate may be any that is desirable and it may have perforations or ribs, being conveniently stamped with or without these means.

Any known method may be followed for depositing the zinc layer on the plate, but it is preferable to use a method by which the zinc layer is made immune from attack by the electrolyte when the circuit is open. For this purpose the supporting plate made in the manner described is located in an electrolytic cell containing a solution of a salt of zinc (as sulphate) together with a salt of mercury (as mercuric sulphate) and a salt of magnesium (as magnesium sulphate) and an electric current is passed through said plate and bath, the plate acting as a cathode. By this operation a layer of zinc is deposited on the plate and owing to action of the salts of mercury and magnesium contained in the bath to said layer is conferred the peculiar character of being not subject to attack by the acid electrolyte of the accumulator when the circuit is open.

The negative plate thus made is of small volume and weight and owing to the nature of its support offers a high resistance to mechanical attack and particularly to vibrations, so that it is well adapted for use on vehicles.

Such a plate has a long life even if the discharge of the accumulator is forced leading to local corrosion of the zinc, for the support is not attacked by the electrolyte and the zinc can always be deposited again during the re-charging.

Finally, owing to the high electrical conductivity of the support, the function of the plate is more uniform and regular than is the case with known plates.

What I claim as my invention and desire to secure by United States Letters Patent is:—

1. A negative electrode for an electric accumulator employing an acid electrolyte, comprising a metallic support, with a surface of silver and a zinc layer electrolytically deposited on said support.

2. A negative electrode for electric accumulators employing an acid electrolyte, comprising a support formed of a silver piece and a zinc layer electrolytically deposited on said support.

3. A process for making a negative electrode, comprising, forming a metallic support, silvering the surface of the support, and then electrolytically depositing a layer of zinc on the support.

Signed at Turin, Italy, 29 July, 1920.

ADOLFO POUCHAIN.